No. 774,274. PATENTED NOV. 8, 1904.
A. PUSTERLA.
PLEASURE WATERWAY.
APPLICATION FILED MAR. 18, 1904.
NO MODEL.
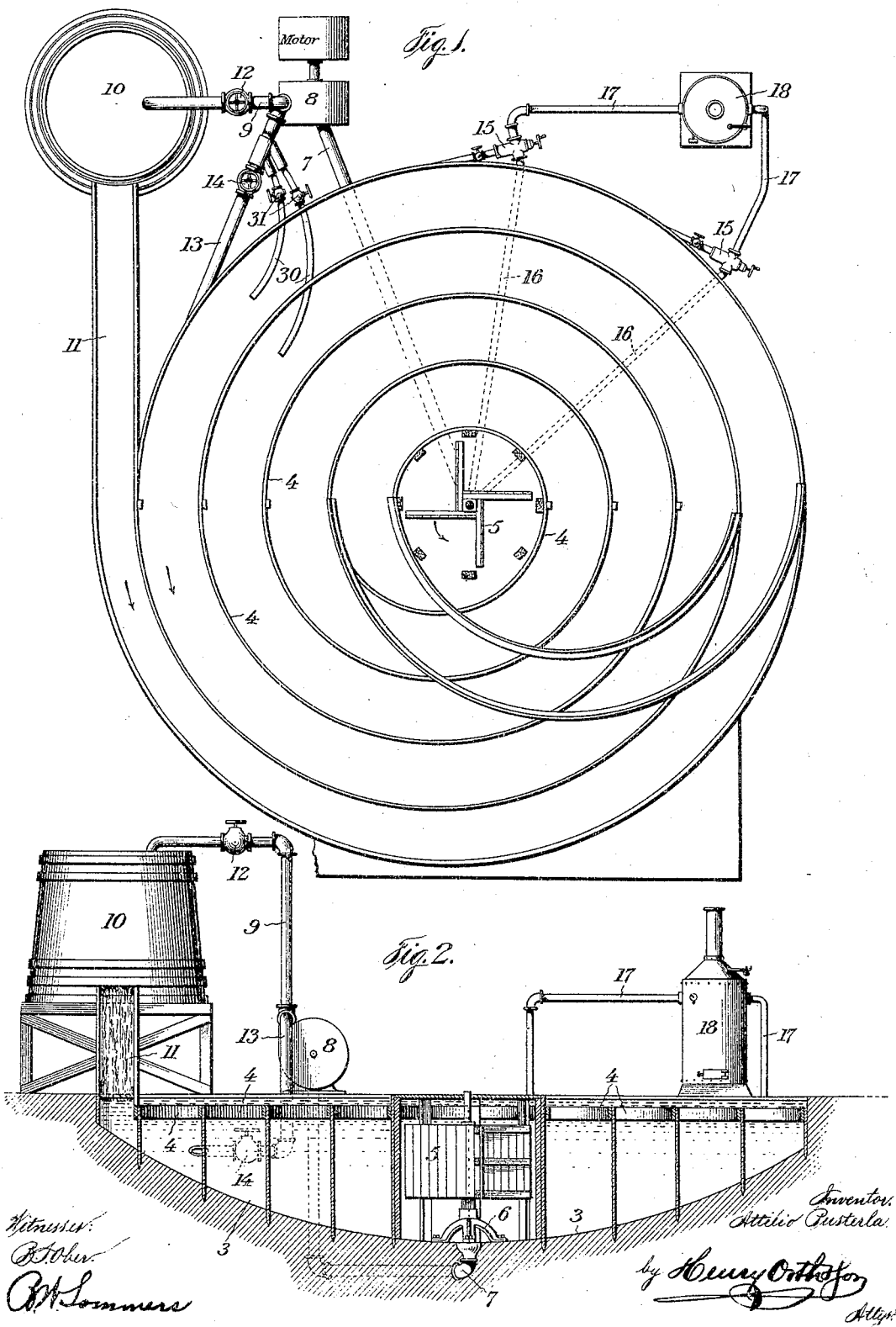

No. 774,274.

Patented November 8, 1904.

UNITED STATES PATENT OFFICE.

ATTILIO PUSTERLA, OF ST. LOUIS, MISSOURI.

PLEASURE-WATERWAY.

SPECIFICATION forming part of Letters Patent No. 774,274, dated November 8, 1904.

Application filed March 18, 1904. Serial No. 198,801. (No model.)

*To all whom it may concern:*

Be it known that I, ATTILIO PUSTERLA, a subject of the King of Italy, residing at 1219 Hodiamont avenue, St. Louis, Missouri, have invented certain new and useful Improvements in Pleasure-Waterways; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to pleasure-waterways, and has for its object means to drive and rotate the water in such waterways when comparatively large rotating bodies of water are used.

In Letters Patent granted to me March 31, 1903, No. 724,040, and March 1, 1904, No. 753,311, I have illustrated waterways in which the rotating body of water is moved by a central stirrer. This is successful for small and moderately sized basins; but where it is desirable to construct large basins to accommodate a large number of patrons the central stirrer would have to be made too large and set too deep in order to properly rotate the water, thereby consuming too much power and space and entailing the cost of a deeper excavation.

Referring to the drawings, in which like parts are similarly designated, Figure 1 is a plan view of so much of a pleasure-waterway as is necessary to illustrate this invention, and Fig. 2 is a vertical central section.

A suitable substantially circular basin 3 is excavated in the ground and lined with cement or otherwise made to hold water. This basin may or may not be provided with boat-guides 4 as shown in the above-mentioned patents. The central stirrer 5 is stepped in a supporting-bracket 6, under which is the entrance to a suction pipe or pipes 7, leading to a centrifugal pump 8, driven by a suitable motor, said pump delivering the water by a pipe 9, having a valve 12, to an elevated tank 10, from which the water runs down an inclined raceway 11, entering the basin tangentially and moving in the general direction of movement of the water in the basin. This raceway may be provided with cascades or other scenic display as may be found desirable. From the delivery-pipe 9 of the pump I have shown a branch pipe 13, having a hand-valve 14, said branch pipe also entering the basin tangentially to inject a stream of water to assist the current in the basin at its periphery, and auxiliary branches 30, each controlled by a valve 31, said auxiliary branches terminating at different radial distances from the center of the basin to inject water at a plurality of points at different radial distances from the center of the basin and in a direction substantially tangential to the direction of movement of the rotating body of water in the basin. Pipes 13 and 30 or pipe 9 may be used to deliver a quantity of water either separately or simultaneously to the basin. Any other means may be used to inject tangentially into the basin sufficient water to assist rotation set up by a central stirrer or to create a current independent of a central stirrer.

I have also shown injectors 15 drawing their supply of water from the center of the basin 3 through pipes 16 and each having a steam-pipe connection 17 to a boiler 18, their delivery-nozzles being set tangentially to the basin. There may be one or more such steam-injectors having their delivery-pipes terminating at different radial distances from the center of the basin, these pipes terminating in relative positions substantially like pipes 30.

Having thus described my invention, what I claim as new therein, and desire to secure by Letters Patent, is—

1. In a pleasure-waterway a substantially circular basin of water and means to supply water tangentially to the basin to rotate the water therein, substantially as and for the purpose set forth.

2. In a pleasure-waterway, a substantially circular basin of water and a pump to force water tangentially into the basin, substantially as and for the purpose set forth.

3. In a pleasure-waterway, a substantially circular basin of water and a centrifugal pump having its water-supply within the basin and its delivery at the edge of the basin, substantially as and for the purpose set forth.

4. In a pleasure-waterway, a substantially circular basin of water and a pump receiving its water-supply from the basin and delivering water at the edge of the basin and tangential thereto, substantially as and for the purpose set forth.

5. In a pleasure-waterway, the combination with a substantially circular basin of an elevated tank, a raceway from the tank to the basin and tangential to the latter, a pump having a suction-pipe communicating with the interior of the basin and a delivery-pipe to the tank, substantially as and for the purpose set forth.

6. In a pleasure-waterway, the combination with a substantially circular basin, of an elevated tank, a raceway between the tank and basin and tangential to the latter, a pump having a suction-pipe arranged to draw its supply of water from within the basin, a delivery-pipe to the tank and a branch delivery-pipe entering the basin tangentially to impart rotation to the body of water in the basin, substantially as set forth.

7. In a pleasure-waterway, a substantially circular basin of water, a central stirrer, and means at the edge of the basin to supplement the action of the stirrer, substantially as and for the purpose set forth.

8. In a pleasure-waterway, a substantially circular basin of water, a central stirrer, and means to supply a quantity of water tangentially to the basin, substantially as and for the purpose set forth.

9. In a pleasure-waterway, a substantially circular basin of water, and means to inject a quantity of water tangentially into the basin at its periphery, substantially as and for the purpose set forth.

10. In a pleasure-waterway, a substantially circular basin of water, a pump, an elevated tank, a suction-pipe between the basin and pump, a valved delivery-pipe between the pump and tank, a raceway connecting the tank and basin and tangential to the latter, and a valved branch delivery-pipe also entering the basin tangentially, substantially as and for the purposes set forth.

11. In a pleasure-waterway, the combination with a substantially circular basin of water, of means to supply water tangentially to the basin at different points of its periphery, substantially as and for the purposes set forth.

12. In a pleasure-waterway, a substantially circular basin, and means to inject water therein at different radial distances from the center of the basin to rotate the body of water in the basin, substantially as and for the purposes set forth.

13. In a pleasure-waterway, a substantially circular basin, means to inject water at the periphery of the basin and auxiliary means to inject water into the same at different radial distances from the center, substantially as and for the purposes set forth.

14. In a pleasure-waterway, a substantially circular basin, a raceway to supply water at the periphery of the basin and means to inject water into the basin at different radial distances from the center thereof, said water supplied substantially tangentially to the direction of movement of the main body of water in the basin, substantially as and for the purposes set forth.

In testimony that I claim the foregoing as my invention I have signed my name in presence of two subscribing witnesses.

ATTILIO PUSTERLA.

Witnesses:
AMEDEO MONDIOLI,
FRANCESCO MASSARONI.